(12) United States Patent
Spies

(10) Patent No.: US 10,798,980 B2
(45) Date of Patent: Oct. 13, 2020

(54) FOREARM GUARD WITH MULTIPLE UTILITIES

(71) Applicant: Alberto Spies, Yonkers, NY (US)

(72) Inventor: Alberto Spies, Yonkers, NY (US)

( * ) Notice: Subject to any disclaimer, the term of this patent is extended or adjusted under 35 U.S.C. 154(b) by 0 days.

(21) Appl. No.: 16/602,059

(22) PCT Filed: Jan. 30, 2018

(86) PCT No.: PCT/US2018/016034
§ 371 (c)(1),
(2) Date: Jul. 29, 2019

(87) PCT Pub. No.: WO2018/144487
PCT Pub. Date: Aug. 9, 2018

(65) Prior Publication Data
US 2020/0000162 A1    Jan. 2, 2020

Related U.S. Application Data

(60) Provisional application No. 62/499,624, filed on Jan. 31, 2017.

(51) Int. Cl.
*H04B 1/3888* (2015.01)
*A41D 27/10* (2006.01)
(Continued)

(52) U.S. Cl.
CPC ............. *A41D 27/10* (2013.01); *A41D 13/08* (2013.01); *G06K 19/0727* (2013.01); *G06Q 30/0267* (2013.01); *H04B 1/385* (2013.01); *H04B 1/3888* (2013.01); *H04B 5/0056* (2013.01); *H04B 5/0081* (2013.01); *H04L 67/18* (2013.01);
(Continued)

(58) Field of Classification Search
CPC ...... H04W 4/80; H04W 76/10; H04B 1/3888; H04B 1/385; H04B 5/0056; H04B 5/0081; H04M 1/0202; H04L 67/18; A41D 27/10; A41D 13/08; G06Q 30/0267; G06K 19/0727
See application file for complete search history.

(56) References Cited

U.S. PATENT DOCUMENTS

| | | | |
|---|---|---|---|
| 2007/0118946 A1* | 5/2007 | Spies | A63B 71/1225 2/16 |
| 2007/0194066 A1* | 8/2007 | Ishihara | A44C 5/0015 224/164 |

(Continued)

*Primary Examiner* — Thanh C Le
(74) *Attorney, Agent, or Firm* — Joseph M. Fowler

(57) ABSTRACT

A forearm guard compressive sleeve is disclosed which functions as a protective guard in athletic endeavors and as fashion apparel and as an advertising and promotional medium. The sleeve is constructed to mitigate the effects of environmental and mechanical hazards, limit the deleterious effects of an athlete's perspiration and muscle stress and imbue the user with psychological confidence in his or her athletic performance. The inventive forearm guard incorporates Near Field Communication components including one of more NFC tags which enable access via NFC-enabled mobile smart phones or computers to the Internet. A method is disclosed enabling celebrity athletes or personnel using the inventive forearm guard to transfer wireless personalized information to fans and supporters including sending virtual autographs and mementos.

6 Claims, 7 Drawing Sheets

(51) Int. Cl.
*H04W 4/80* (2018.01)
*H04W 76/10* (2018.01)
*A41D 13/08* (2006.01)
*G06K 19/07* (2006.01)
*G06Q 30/02* (2012.01)
*H04B 1/3827* (2015.01)
*H04B 5/00* (2006.01)
*H04L 29/08* (2006.01)
*H04M 1/02* (2006.01)

(52) U.S. Cl.
CPC ........... *H04M 1/0202* (2013.01); *H04W 4/80* (2018.02); *H04W 76/10* (2018.02)

(56) References Cited

U.S. PATENT DOCUMENTS

| 2015/0227245 A1* | 8/2015 | Inagaki | G06F 3/0412 |
| | | | 345/173 |
| 2015/0332105 A1* | 11/2015 | Waters | H04L 63/0884 |
| | | | 382/116 |

* cited by examiner

FOREARM GUARD WITH MULTIPLE UTILITIES

CROSS-REFERENCE TO RELATED APPLICATIONS

The present application claims the benefit of U.S. Provisional Patent Application No. 62/499,624, filed on Jan. 31, 2017, which is expressly incorporated herein in its entirety by reference thereto.

FIELD OF THE INVENTION

This invention relates to arm guards or compression sleeves, and, more particularly, to forearm guards designed primarily for use as sports, fashion and advertising accessories.

BACKGROUND OF THE INVENTION

While the use of arm guards for military purposes is ancient and the use of compression hosiery for medical purposes is more than one hundred years old, the use of forearm guard compression sleeves as a fashion and apparel accessory is a newer development more recently visible in professional baseball and basketball.

The rise in popularity of social media due to widespread electronic communications availability via the Internet, especially in relation to the rise of mobile phone usage throughout the world, together with the further miniaturization of the physical components of the electronic structures themselves has given rise to the so-called "Internet of Things", or "IoT". The mobile phone as a computing device containing a radio is able to wirelessly connect with other radio responsive devices carried by "real" world mechanical devices. One such interactive technology is NFC, or Near Field Communications, which is a radio standard defined by international treaty. This particular radio technology was made available by Google on its mobile devices by incorporation into their Android operating system in 2010. While the radio component technology was included in the chipset for most mobile phones, Apple Corporation only introduced a version of NFC in association with electronic payments. Millions of NFC tags and chips together with NFC reader/writer devices have been used for keeping inventory in industrial applications with and without mobile phones. Two more recent non-industrial examples of NFC tag-embedded devices are U.S. Pat. Nos. 9,444,524 B2 and 9,619,745 B1 related to the use of NFC tags in association with jewelry. However, implementation of devices taking advantage of the widespread communication possibilities carrying NFC tags in a non-industrial context to date have been relatively limited.

SUMMARY OF THE INVENTION

A forearm guard is disclosed with a plurality of uses. A first object and use of the invention is to provide an effective device to protect a person's forearms against impacts occurring during participation in athletic activity. It can also be used to provide protection when arms are exposed to various environmental and mechanical hazards. As such it is important to provide a forearm guard that is both lightweight—allowing complete freedom of movement—as well as being easy to put on and take off.

Another important function and object of the inventive forearm guard is to mitigate the effects of excess perspiration excreted along a wearer's arm interfering with the ability to manually manipulate a bat or swing a racquet properly. Excess perspiration can affect a baseball player's grip as he or she swings a bat and it can impede the effective grip a tennis player has on a racquet. In a related example, a positive grip is important in basketball or in any ball throwing sport, therefore it is important that the forearm guard limit the negative effects of perspiration.

A third object of the inventive forearm guard is to keep underlying arm muscles warm at a consistent temperature to help prevent muscle spasm or muscle strain which can occur when muscles under stress are subject to abrupt temperature fluctuation.

An object of the invention is to provide a wearer with arm compression which acts to benefit a person performing athletic activity such as swinging a bat or racquet by providing increased psychological confidence.

Another important object of the inventive forearm guard is to function visibly as a fashion accessory. As a fashion accessory the forearm guard becomes a mobile and wearable advertising device. In this sense, the physical presence of the device, worn in plain sight on a forearm can function as a mobile display carrying corporate or publicly displayed logos and trade names.

In conjunction with this display advertising function, a preferred embodiment of the inventive forearm guard contains a composite communication component enabling wireless communication between the forearm guard and a smart phone or other suitably equipped electronic device. A preferred communication technology component utilizes a NFC (Near Field Communication) tag or chip affixed to the forearm guard. Therefore, it is an object of the inventive forearm guard to provide access to information and media accessible via the Internet. The digitized information or media of current interest may be stored remotely in a computer or in a particular computerized software "cloud" location uniquely associated with the identity of the NFC tag carried by the forearm guard.

Celebrity athletes through use of the forearm guard can initiate automated electronic downloads of relevant personal or team statistics or media related to their endeavors. This information can appear virtually instantly on the mobile phones of their fans and supporters if the phones are placed near enough to the forearm guard. Of particular benefit to a celebrity athlete, or to any famous, well known or celebrated person sought out for his or her handwritten signature, is the feature of the inventive mobile and wearable forearm guard as communication apparel which can initiate an alternative "virtual" signature experience to a particular fan or enthusiastic supporter when the sleeve is brought into close proximity with their mobile phone. Generally speaking, baseball players and other professional athletes in our current social milieu are expected or at least encouraged to "sign" by autograph items brought to them by fans or supporters. Autographing items is distracting and time-consuming, as it would be to anyone, but it demonstrates the openness of character and sociability of the celebrated person and tends to improve their perceived public image. "Tagging" by bringing a mobile phone into close proximity with a forearm sleeve equipped with an appropriately coded NFC tag is far more efficient and easier to accomplish timewise than having a celebrity pose with someone for a "selfie" photo on behalf of a fan or supporter. Therefore, it is an important object of this invention to improve the experience of a fan or supporter of a celebrated person by providing a faster, more convenient, simulated method of securing autographs or signatures as mementos of a proximate physical encounter with a famous person.

DETAILED DESCRIPTION OF THE INVENTION

Figure 1:
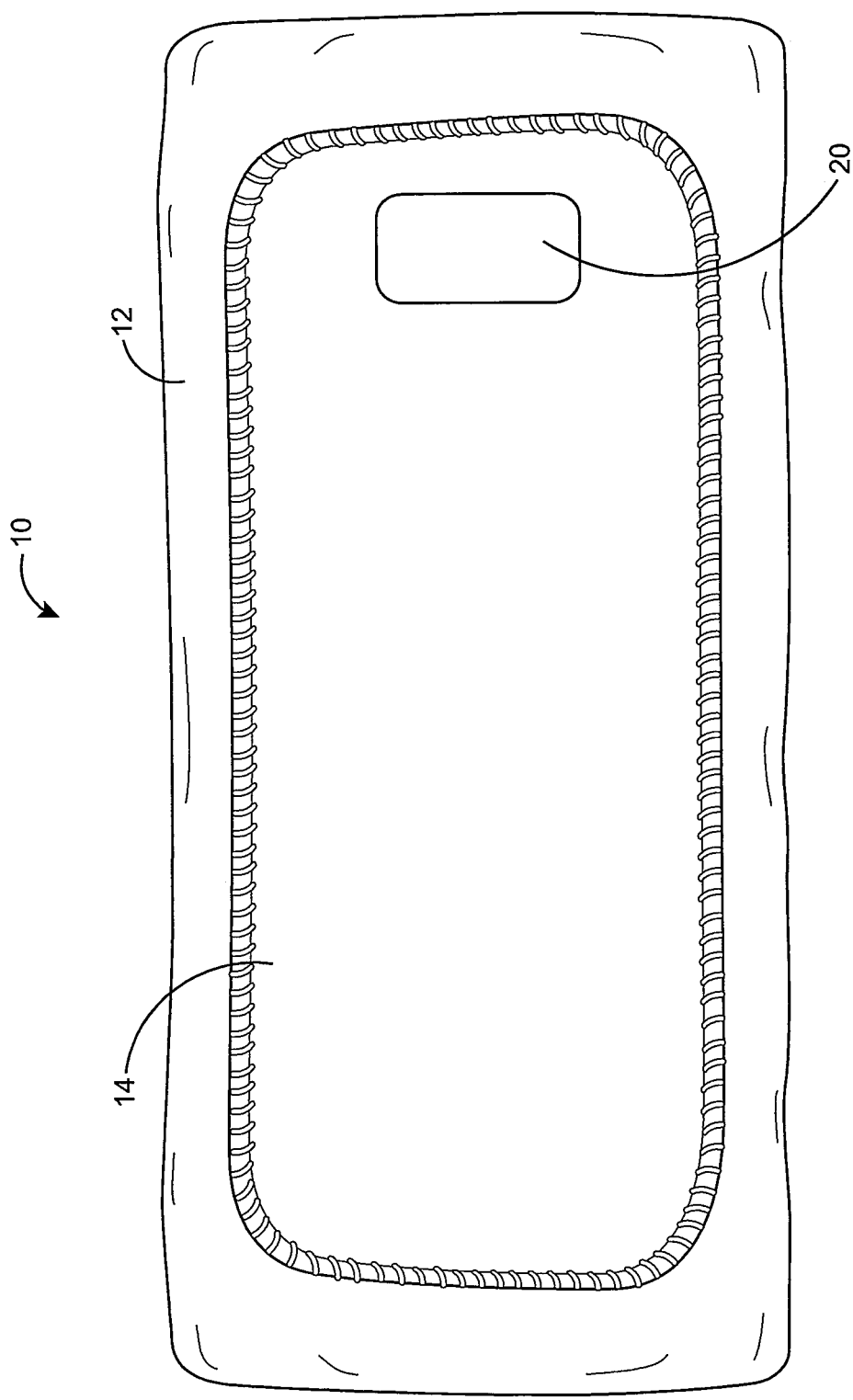
FIG. 1 is a top plan view of the inventive forearm guard.

With reference to FIG. 1 of the drawing, the forearm guard 10 is shown comprising three distinct visible components, namely, a sleeve 12, an impact or shock absorbing pad 14 and a logo feature 20 suitable for commercial or promotional purposes.

Figure 2:
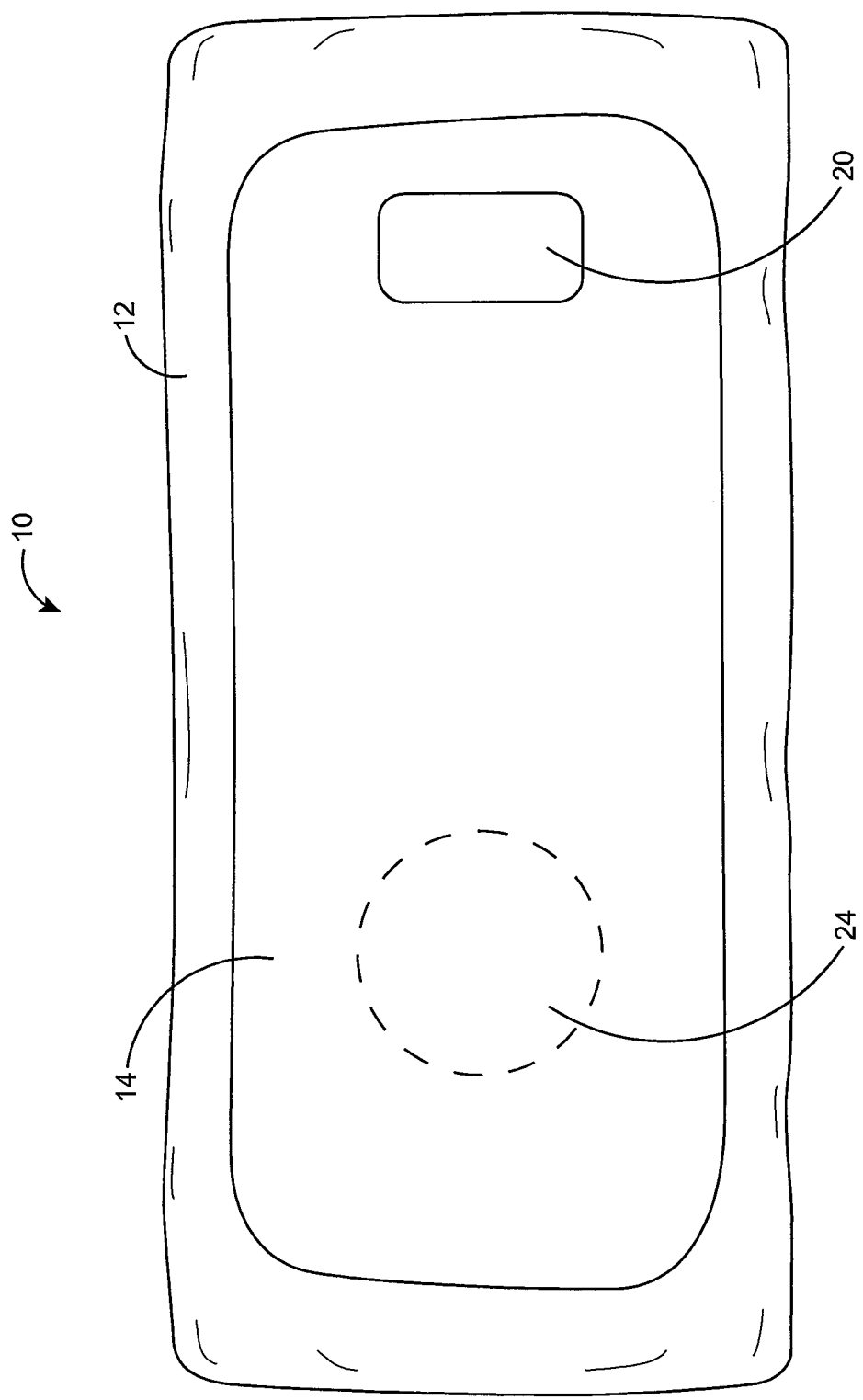
FIG. 2 is an outline plan view of the inventive forearm guard shown in FIG. 1 indicating the approximate location of an NFC (Near Field Communication) tag contained within the forearm guard.

In FIG. 2 a fourth basic component, an NFC tag communication component 24, is shown in dashed lines indicating it is not visible from the surface of the forearm guard 10.

Figure 3:
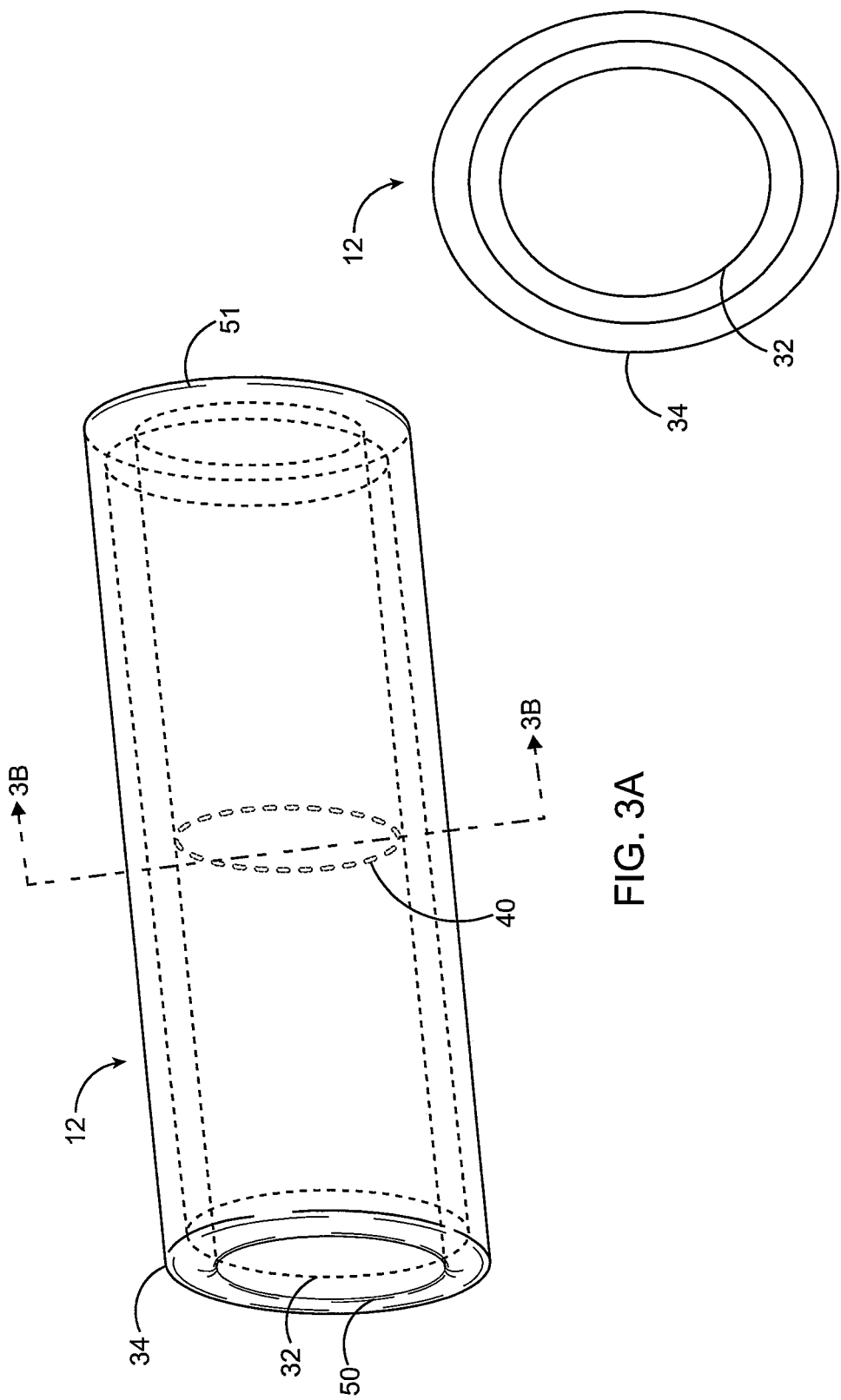
FIG. 3A is a perspective drawing of the sleeve portion of the inventive forearm guard illustrating the clear passage extending through the full interior length of the sleeve.
FIG. 3B is a side elevation in cross-section taken along the lines 3B-3B of FIG. 3A of the sleeve portion of the forearm guard.

In FIGS. 3A and 3B the sleeve 12 is illustrated as an oval or circular tube. In FIG. 3B the sleeve 12 of the forearm guard 10 is shown in cross-section comprised of layers 32,34 of woven stretchable fabric formed into a tubular shape. The sleeve is of a size and elastomeric material composition adapted to conform to the external surface of a person's forearm. As depicted in FIGS. 1 and 2, the typical forearm guard 10 is approximately 23 cm (9") in length and 8 cm (3") wide. The layers of cushioned woven material are each approximate 3 mm thick when relaxed and unstretched. Each sleeve 12 is woven into a single tubular length of cushioned material folded back inside itself and sewn together internally at seam 40 which is generally located at a midpoint between and distal to rounded ends 50 and 51 as depicted in FIG. 3A.

When initially supplied in a package and delivered to the user, the forearm guard sleeve 12 is nearly flat. It opens when a person's fingers and knuckles force the stretchable fabric outward as he or she pushes a hand and arm through the inside of the sleeve. When in proper position, the forearm guard sleeve 12 slightly compresses the skin and underlying muscles and tendons of the forearm as it is made from stretchable, elastic, springy material, not too different from the material used to make some types of athletic hosiery. The conformability of the elastomeric fabric is a function of the type of weave and the fiber composition of the material which is typically 94% cotton and 6% Lycra elastane. The tightly conforming resilient and stretchable material remains firmly in place even during rapid arm movement. The compressive force on the surface of the forearm has a noticeable positive psychological effect on the confidence of the wearer and has been credited with improved athletic performance in numerous instances.

In a preferred embodiment, the layer of material in contact with the skin of the forearm is made from perspiration absorbent material. Perspiration absorbent material may be used in combination with woven or knit material designed to wick away perspiration. The sleeve 12 itself has the feel of terry cloth for superior sweat absorption.

The tubular guard 10 with its perspiration absorption characteristics also acts to stabilize internal muscle temperatures in the forearm of the wearer and thereby reduces the risk of muscle strain due to adverse temperature conditions.

As shown in FIGS. 1,2, 4, 5 in the Drawings, a portion of the sleeve 12 is covered by an impact absorbing pad 14. The forearm guard 10 is designed to be worn such that the impact absorbing surface 14 faces outward, distal from the player's torso in a manner to deflect a potentially harmful incoming object—like a wild pitch delivered to a baseball batter. The impact or shock absorbing pad 14, in the form of a composite fabric is manufactured from neoprene, the synthetic polymer which is water and weather resistant. The pad 14 is shown in FIG. 1 fixedly sewn in place on the forearm sleeve.

In the embodiments of the forearm guard shown throughout the Drawings, a logo 20 can be displayed on the forearm guard for purposes of advertising. Athletes and participants in public events often wear clothing or gear with visible display advertising. More uncelebrated, ordinary folk often wear advertising for fashion reasons. Therefore, it is anticipated that display advertising will be placed on, or fixed onto, the impact absorbing pad 14 as indicated by depiction of the outline of a place 20 for a logo or other advertising message. However numerous other configurations can be foreseen which include placing or incorporating decorative, illustrative or written visual advertising messages anywhere on the impact absorbing pad 14 or on the sleeve 12 itself. Expansive displays using conventional techniques could be printed over the entire forearm guard if there is a demand for such a display.

Figure 6:
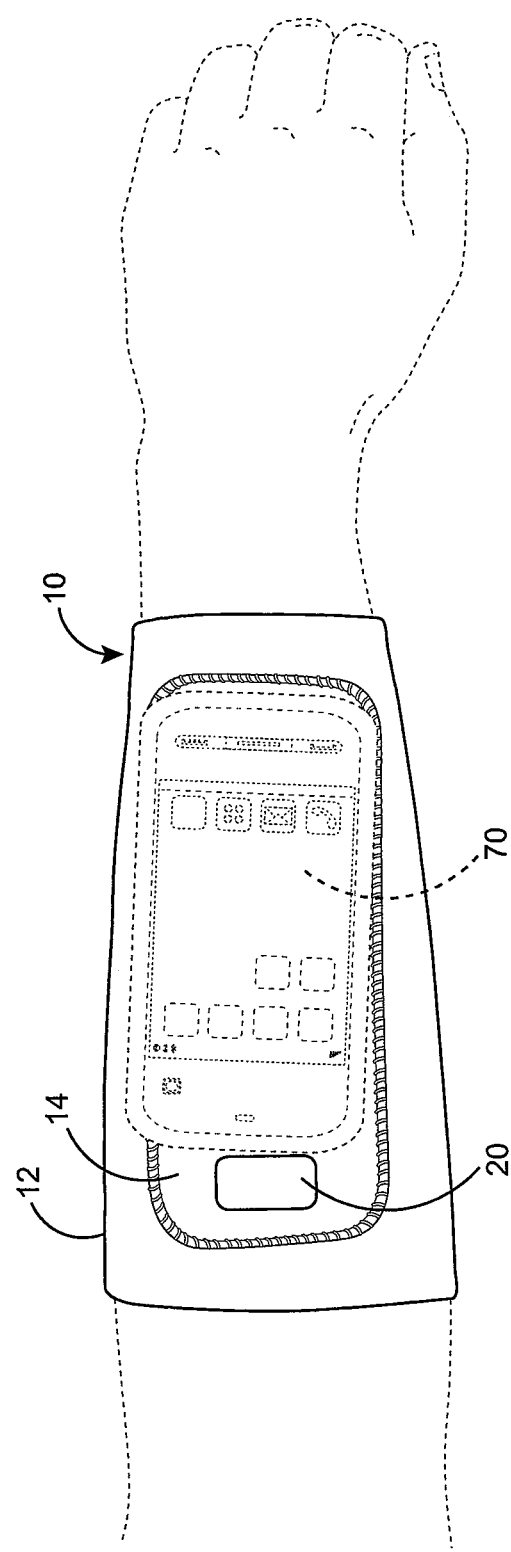
FIG. 6 is an illustration of a mobile phone equipped internally with an NFC reader/writer enabled radio placed proximately above the location of the NFC tag embedded within the forearm guard.

The preferred embodiment of the inventive forearm guard 10 can transfer or receive digital information wirelessly to and from a digital information computing device such as a smart phone. Recent smart phones carry a radio technology that is globally available and operates in the ISM band of 13.56 Mhz implementing international treaty standards defined in ISO/IEC 18000-3. This "proximity card" technology is referred to as Near Field Communication (NFC) and it employs electromagnetic induction between two loop antennas to effect the transfer of signal information. NFC-enabled devices exchange information in an air interface at rate ranging from 106 to 424 kbits/sec by means of a Near Field Communication tag (NFC tag) or a plurality of such tags. As shown in FIG. 6, when a smart phone 70 or other NFC enabled device is brought within range of an appropriately encoded NFC tag 24 contained within or affixed to the forearm guard 10, the NFC tag can transmit information to the NFC-enabled device. When the smart phone is placed near the NFC tag—normally within 2.5 cm or less—a signal emanating from the phone can enable the tag within the forearm sleeve to send a message to the phone triggering a software event such as sending a "uri", a Uniform Resource Identifier, or a "url", a Uniform Resource Locator such as a web address location available through the Internet. The code sent through the Internet can initiate a software sequence of events causing a web page to appear on the screen of a smart phone or similarly configured mobile or fixed computing device.

The triggering signal emanating from the NFC tag can be used to call up a particular website or a specific web advertising address associated with the logo or trade name that is displayed visually on the outside of the forearm guard. Thus, a website or digital display on the screen of the mobile phone or other device re-informs and reinforces the effectiveness of the visual advertising on the sleeve itself. In this inventive embodiment, the forearm guard becomes an important device for advertising and can be used to purvey relevant information far beyond the fashion display or the function of the forearm guard for its mechanical utility on the athletic field.

The digital information viewable on a smart phone triggered by proximity to an appropriately coded NFC tag on the forearm guard can be commercial in nature or otherwise informative in a social media context. For example, a celebrity athlete using the forearm guard displaying his personal image or team logo could "tag" smart phones of fans and supporters directing their phones to a website or to a digital repository containing statistics related to his or her athletic endeavors, or, alternatively, to some website or relevant Facebook page or similar social media entity devoted to a charitable or social cause. When appropriately coded, this communication feature can become multi-person allowing fans and supporters to send information to others or to the famous person initiated by downloaded software changes to the NFC tag.

In a further enhancement to the inventive forearm sleeve, it is anticipated that in conjunction with the "tagging" from a famous person followed by the download of information or media to the screen of the smart phone, there can be provided the display of a signature or autograph as if it is being cursively written in real time. The cursively written image can be accompanied by vibrational haptic feedback occurring on the phone of the fan or supporter simultaneously with the pre-determined length of time required for the cursively written handwritten signature to appear. Such a feature will enhance the feeling that the fan is in real personal contact with the celebrated person.

Commercial enterprises in similar fashion can have the forearm guard carrying their particular trademark or logo trigger a smart phone to display information relevant to their products and services or messages.

Figure 4:
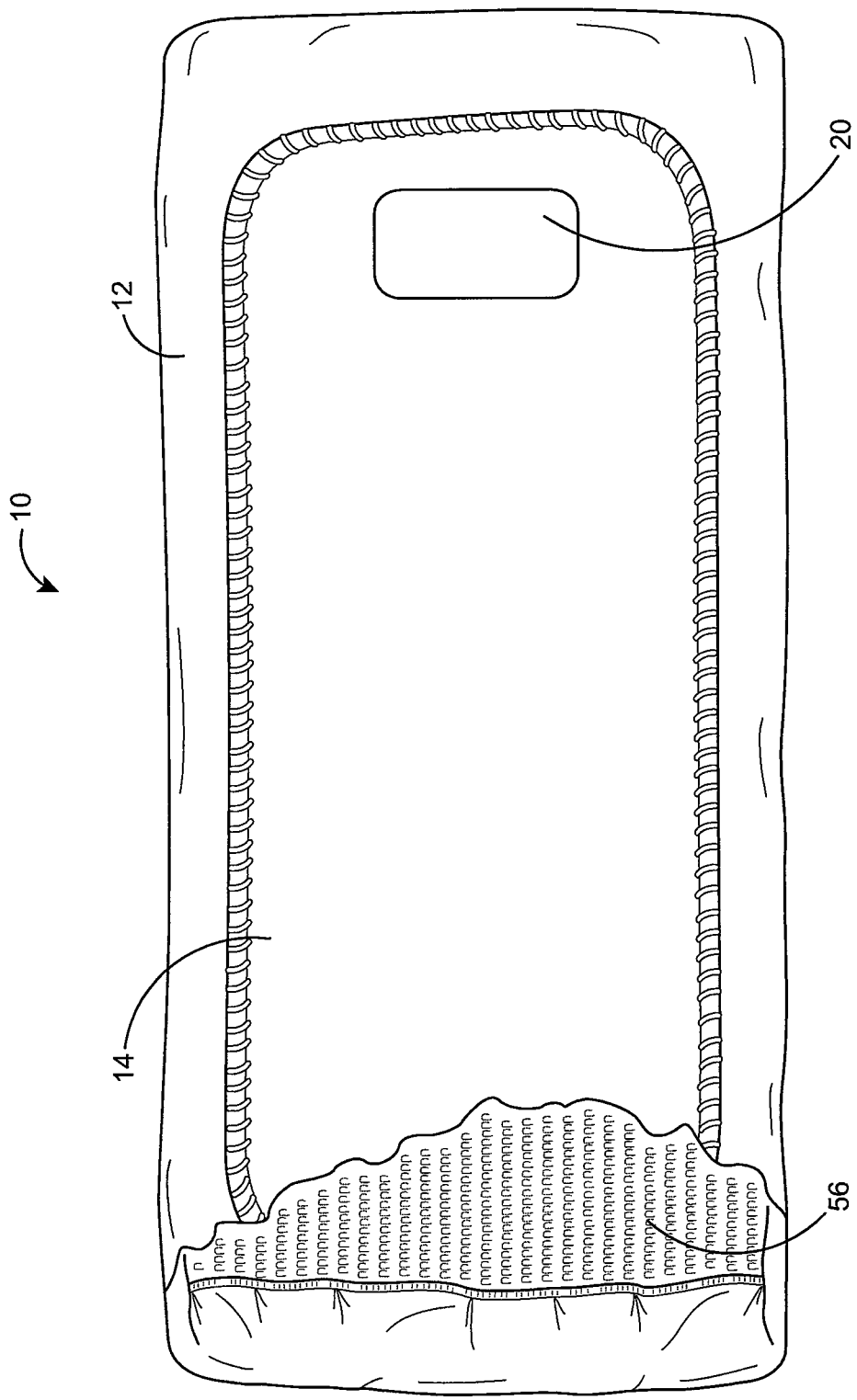
FIG. 4 is a partially cutaway illustration of the forearm guard revealing the woven cushioned layers of the sleeve.
Figure 5:
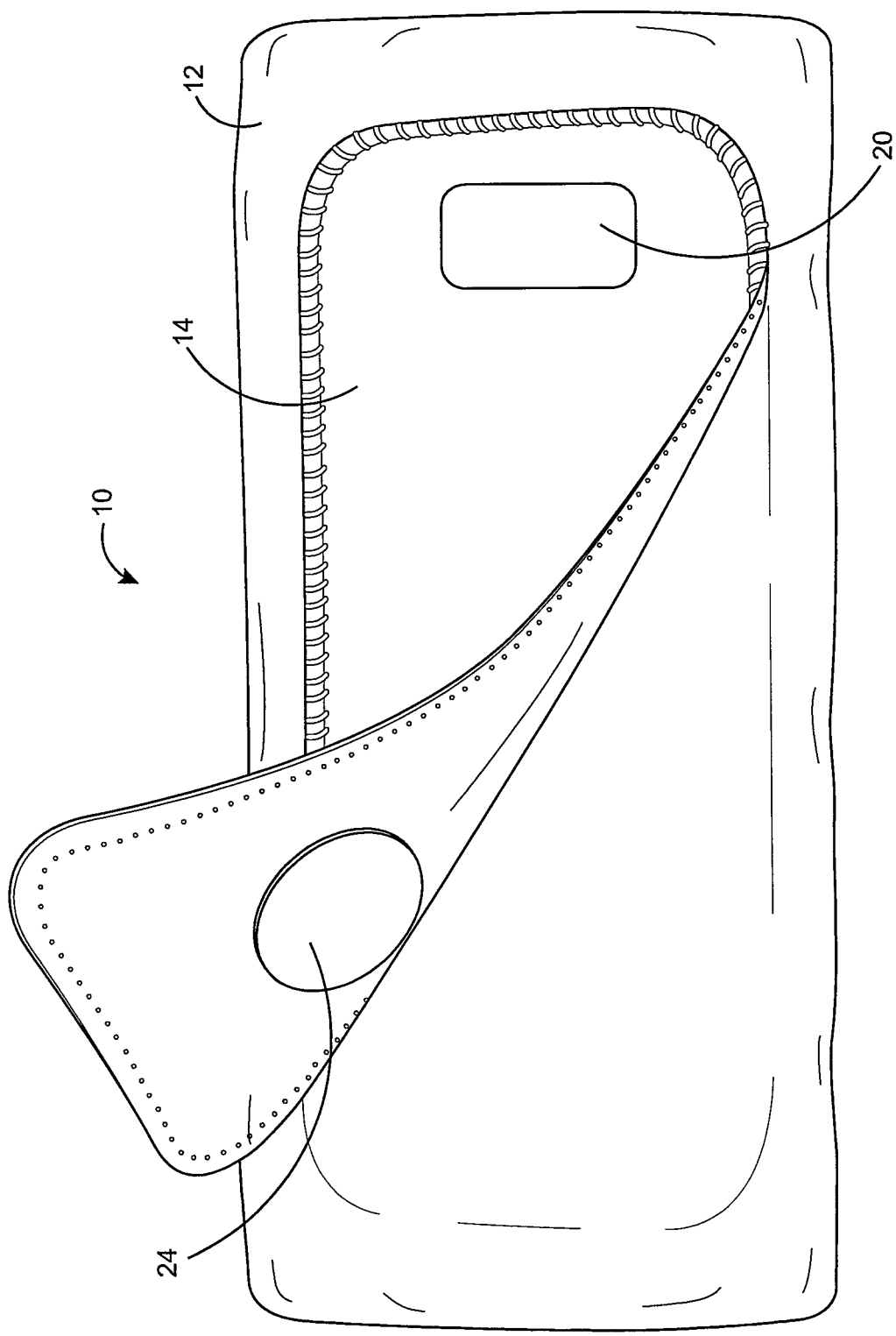
FIG. 5 is a plan view of the forearm guard depicting the NFC tag fixed to the underside of the protective pad, said protective pad being folded back to reveal a portion of its underside.

As shown in FIG. 5, an NFC tag 24 is attached to the underside of the impact absorbing pad 14. The NFC tag is normally encapsulated in a plastic envelope in a fairly rugged form factor. In this configuration it is protected from adverse environmental conditions because of its location beneath the neoprene impact absorbing pad which is typically 3 mm to 10 mm in thickness. The cushioned interior 56 of the sleeve visible in FIG. 4 is the top surface of the woven cotton/lycra substrate which acts as a double layer shock absorber.

Figure 7:
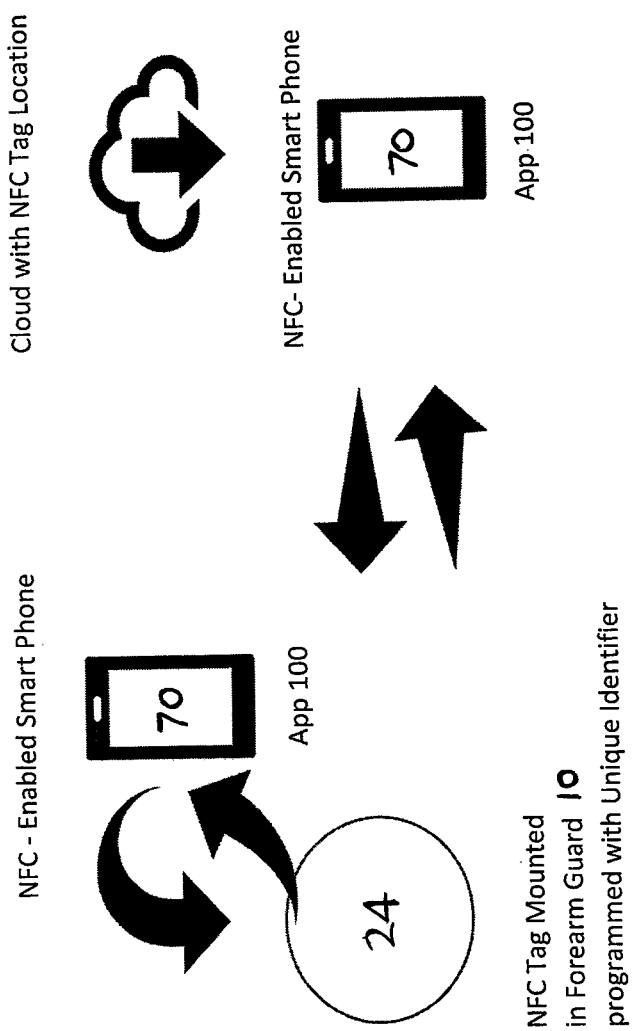
FIG. 7 illustrates diagrammatically a typical system design of the inventive forearm guard in association with an NFC-enabled smart phone.

FIG. 7 illustrates diagrammatically a typical system design of the inventive forearm guard in association with a NFC-enabled smart phone 70. A software application, an "App", App 100 is downloaded into the smart phone. The NFC smart phone app 100 will associate the information on an NFC tag 24 with a location in a cloud storage system. The NFC tag 24 carries a unique software address identifier which is usually pre-loaded into the tag. When the phone 70 touches the outside of the forearm guard 10 it detects an appropriately coded tag 24 and creates an NFC link with the tag. The information on the tag is read by the phone which directs App 100 to connect the smart phone to the uniquely identified address in the software cloud. Information or media stored at that cloud location that is specifically associated with the unique tag address can be downloaded to the user's phone. The software content in the cloud can be uploaded or downloaded by the creator of the website or software repository. Virtually any type of content can be uploaded including audio, video, text and images.

The memory content of a single NFC tag is very limited, however, the tag performs largely a switch or gatekeeper function connecting the NFC-enabled device, such as a smart phone, to a uniquely designated remote software storage depository which can be of almost unlimited storage capacity.

While the invention has been specifically described in connection with the embodiment illustrated in the drawings, it is understood that these are for illustration and not limitation and modifications are possible without departing from the scope of the invention as described and presently disclosed in the following appended claims.

What is claimed is:

1. A forearm guard compression sleeve for use as a sports, fashion and advertising device comprising:
   a sleeve of tubular construction made of stretchable material and conformable to the forearm of a wearer,
   an impact absorbing pad affixed to an external surface of said sleeve to protect the wearer from athletic and environmental hazards,
   said impact absorbing pad and said external surface of said sleeve adapted for imprinting visible images for fashion and display advertising,
   and, a Near Field Communication tag contained within the forearm guard adapted to communicate wirelessly with a smart phone to enable selected digital media to appear on the display of said smart phone.

2. A forearm guard compression sleeve as in claim 1, wherein the sleeve of tubular construction is woven into a tubular length of cushioned material folded back inside itself and sewn together internally at a seam midpoint between and distal to the ends of the tube.

3. A forearm guard compression sleeve as in claim 2, wherein the sleeve is woven from a composition of fiber material which is 94% cotton and 6% elastane.

4. A method of providing users of wearable communication apparel in the form of a forearm guard and compression sleeve allowing transfer of digital content from an Internet cloud location, the method comprising:
   a. providing a forearm compression sleeve containing an NFC tag having a unique electronic identifier,
   b. positioning a smart phone which is NFC enabled and has an app downloaded to access information from the NFC tag in proximate location enabling the establishment of a near field communication link with said tag,
   c. transmitting, using said smart phone, through the downloaded app and the Internet the unique location correlating the NFC tag to a cloud location in which digital content can be accessed and viewed through the user's smart phone.

5. The method according to claim 4 where the user's smart phone or other NFC enabled device, when proximately located, can be used to read instructions from or write instructions to the NFC tag.

6. The method according to claim 4 where some users are famous persons and some users are their fans or supporters, and the digital content is the transmission of a virtual cursively handwritten signature of the famous person to a fan or supporter wherein the digital content transmission of the virtual handwritten signature is visually displayed appearing as if it is cursively written in real time as it is downloaded to the smart phone, said transmission including software instructions enabling the smart phone to generate vibrational haptic feedback corresponding simultaneously with the pre-determined length of time required for the cursively handwritten signature to appear.

\* \* \* \* \*